United States Patent
Van Dyke

(10) Patent No.: US 8,698,814 B1
(45) Date of Patent: Apr. 15, 2014

(54) PROGRAMMABLE COMPUTE ENGINE SCREEN MAPPING

(75) Inventor: James M. Van Dyke, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 844 days.

(21) Appl. No.: 12/578,391

(22) Filed: Oct. 13, 2009

(51) Int. Cl.
*G06F 15/16* (2006.01)
*G06F 15/80* (2006.01)
*G06F 9/46* (2006.01)

(52) U.S. Cl.
USPC .......................... 345/502; 345/503; 345/505

(58) Field of Classification Search
USPC .................... 345/502–506; 718/105
See application file for complete search history.

(56) References Cited

U.S. PATENT DOCUMENTS

2005/0041031 A1* 2/2005 Diard ........................... 345/505
2005/0251358 A1* 11/2005 Van Dyke et al. ............ 702/117

OTHER PUBLICATIONS

Nieh et al., Volume rendering on scalable shared-memory MIMD architectures, Dec. 1992, 14-24.*

* cited by examiner

*Primary Examiner* — Kee M Tung
*Assistant Examiner* — Robert Craddock
(74) *Attorney, Agent, or Firm* — Patterson + Sheridan, L.L.P.

(57) ABSTRACT

A mapping engine maps general processing clusters (GPCs) within a parallel processing subsystem to screen tiles on a display screen based on the number of enabled streaming multiprocessors (SMs) within each GPC. A given GPC then generates pixels for the screen tiles to which the GPC is mapped. One advantage of the disclosed technique is a given GPC performs a fraction of the processing tasks associated with the parallel processing subsystem that is roughly proportional to the fraction of SMs included within the GPC.

21 Claims, 13 Drawing Sheets

GPC TABLE
╱— 500

X POSITION: 0  1  2  3  4  5  6  7

| 0 | 1 | 2 | 3 | 1 | 2 | 3 | 2 |

GPC ASSIGNMENT GRID
500

| X POSITION: | 0 | 1 | 2 | 3 | 4 | 5 | 6 | 7 |
|---|---|---|---|---|---|---|---|---|
| Y POSITION: 0 | 0 | 1 | 2 | 3 | 1 | 2 | 3 | 2 |
| 1 | 1 | 2 | 3 | 1 | 2 | 3 | 2 | 0 |
| 2 | 2 | 3 | 1 | 2 | 3 | 2 | 0 | 1 |
| 3 | 3 | 1 | 2 | 3 | 2 | 0 | 1 | 2 |
| 4 | 1 | 2 | 3 | 2 | 0 | 1 | 2 | 3 |
| 5 | 2 | 3 | 2 | 0 | 1 | 2 | 3 | 1 |
| 6 | 3 | 2 | 0 | 1 | 2 | 3 | 1 | 2 |
| 7 | 2 | 0 | 1 | 2 | 3 | 1 | 2 | 3 |

GRID CELL 602-1 (top-left)
GRID CELL 602-n (bottom-right)

FIG. 6

GPC ASSIGNMENT GRID
/— 700

| X POSITION: | 0 | 1 | 2 | 3 | 4 | 5 | 6 | 7 |
|---|---|---|---|---|---|---|---|---|
| Y POSITION: 0 | 0 | 1 | 2 | 3 | 1 | 2 | 3 | 2 |
| 1 | 2 | 0 | 1 | 2 | 3 | 1 | 2 | 3 |
| 2 | 1 | 2 | 3 | 1 | 2 | 3 | 2 | 0 |
| 3 | 3 | 1 | 2 | 3 | 2 | 0 | 1 | 2 |
| 4 | 3 | 2 | 0 | 1 | 2 | 3 | 1 | 2 |
| 5 | 1 | 2 | 3 | 2 | 0 | 1 | 2 | 3 |
| 6 | 2 | 3 | 2 | 0 | 1 | 2 | 3 | 1 |
| 7 | 2 | 3 | 1 | 2 | 3 | 2 | 0 | 1 |

GRID CELL 702-1 (row 1)
GRID CELL 702-n (bottom-right)

FIG. 7

PROGRAMMABLE COMPUTE ENGINE SCREEN MAPPING

BACKGROUND OF THE INVENTION

1. Field of the Invention

The present invention generally relates to computer hardware and more specifically to programmable compute engine screen mapping.

2. Description of the Related Art

The processing power of a modern central processing unit (CPU) may be supplemented using a co-processor, such as a graphics processing unit (GPU). The GPU may perform general processing operations or graphics processing operations on behalf of the CPU. When performing graphics processing operations, the GPU generates digital images that can be output to a display device. When the GPU outputs a digital image to the display device, the display screen displays each pixel of the digital image.

Some GPUs include one or more "general processing clusters" (GPCs) that each outputs pixels associated with different regions of the screen. For example, a GPU could include two GPCs that each outputs pixels associated with different quadrants of the screen. The first GPC could output pixels associated with the upper left and lower right quadrants of the screen, while the second GPC could output pixels associated with the lower left and upper right quadrants of the screen. When a GPC is configured to output pixels associated with a particular screen region, the GPC is "mapped" to that screen region. The mapping between GPCs and screen regions is typically fixed in conventional GPUs.

Each GPC may include one or more "streaming multiprocessors" (SMs) that each generates a portion of the pixels output by the GPC. A given SM within a GPC generates pixels residing within one or more of the screen regions to which the GPC is mapped. For example, the first GPC described in the above example could include two SMs, where the first SM generates pixels residing within the upper left quadrant of the screen and the second SM generates pixels residing within the lower right quadrant of the screen. Additionally, each GPC may dynamically assign SMs included in the GPC to one or more of the screen regions to which the GPC is mapped.

One or more of the SMs within a given GPC may be disabled for various reasons. For example, certain SMs could be disabled due to manufacturing defects. Alternatively, the manufacturer of the GPU could intentionally disable SMs within specific GPCs in order to provide a low-cost version of the GPU having reduced processing power. With a reduced number of enabled SMs, a given GPC has a reduced capacity to generate pixels. Nonetheless, that GPC still must generate pixels residing within the screen regions to which the GPC is mapped based on the fixed mapping. Consequently, any GPC having a sub-normal number of active SMs may become overburdened with processing tasks.

As the foregoing illustrates, what is needed in the art is a more flexible way to map GPCs to specific regions of a display screen.

SUMMARY OF THE INVENTION

Embodiments of the invention include a method, computer readable medium, and system for mapping general processing clusters (GPCs) to screen tiles of a display screen, where each GPC includes one or more parallel processing units, by determining a total number of parallel processing units that are enabled within the GPCs and mapping the GPCs to N screen tiles, wherein N is proportional to the total number of enabled parallel processing units, and the number of times each GPC is mapped is proportional to the number of enabled parallel processing units therein.

Advantageously a GPC performs a portion of the total processing tasks that is based on the amount of processing power the GPC provides. In addition, GPCs are assigned to screen tiles such that vertically, horizontally, and diagonally adjacent screen tiles are mapped to different GPCs, thereby avoiding a situation where a single GPC performs a disproportionate amount of processing tasks. Finally, a mapping engine is configured to dynamically re-map GPCs to screen tiles, thereby flexibly adapting to situations where different numbers of SMs are enabled.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5B is a conceptual diagram that illustrates a GPC table, according to one embodiment of the invention;

FIG. 6 is a conceptual diagram of a GPC assignment grid, according to one embodiment of the invention;

FIG. 7 is a conceptual diagram of another GPC assignment grid, according to one embodiment of the invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
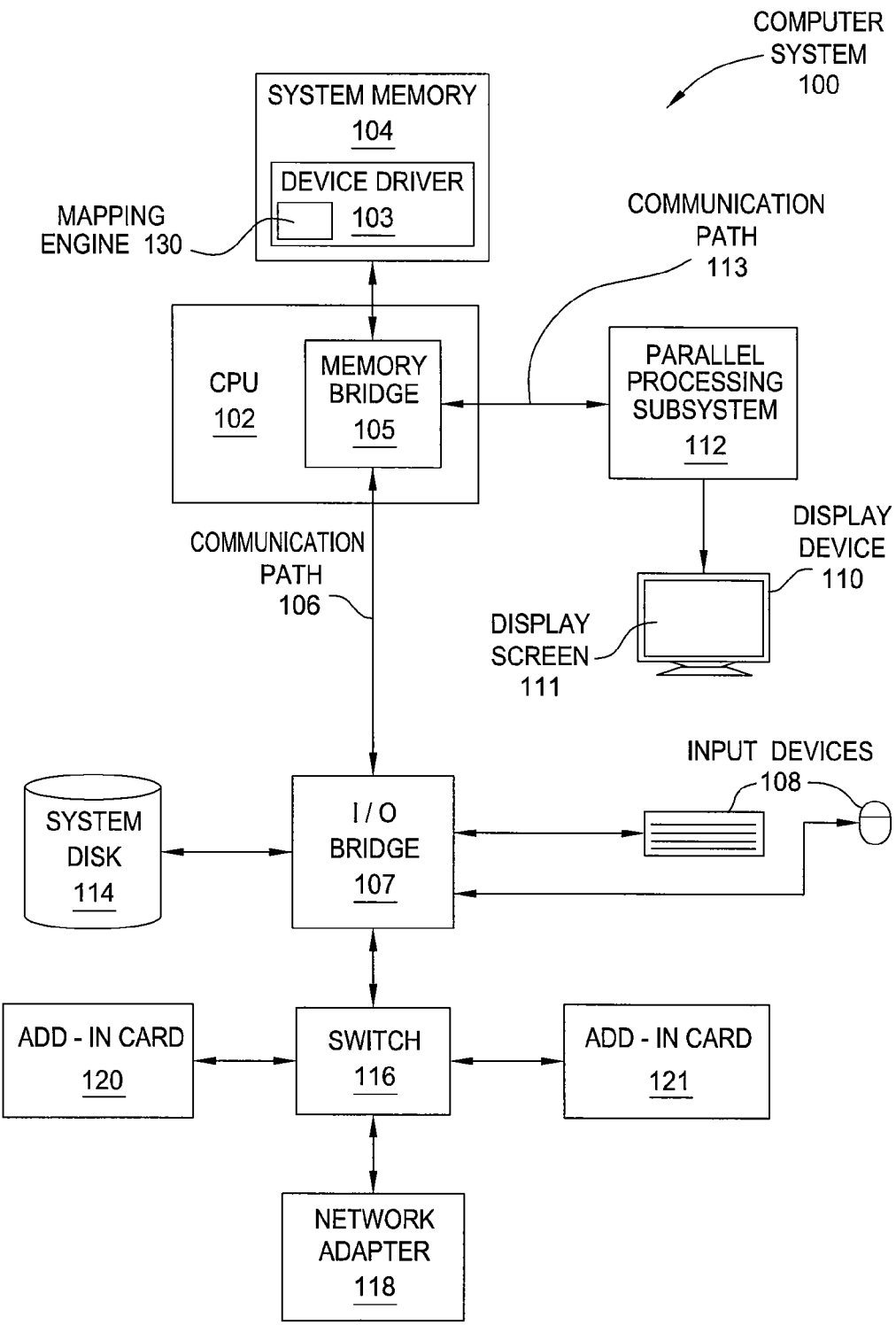
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The system memory 104 includes a device driver 103 that, when executed by the CPU 102, controls the operation of parallel processing subsystem 112. Device driver 103 includes a mapping engine 130. The mapping engine 130 is configured to divide a display screen 111 associated with the display device 110 into a number of "screen tiles." In one embodiment, each screen tile comprises a 16-pixel by 16-pixel square. Parallel processing subsystem 112 includes one or more "general processing clusters" (GPCs), each of which outputs pixels for one or more of the screen tiles. As described in greater detail below in conjunction with FIGS. 5A-10, mapping engine 130 maps a given GPC to a certain number of screen tiles based on the processing capabilities of the GPC.

Figure 2:
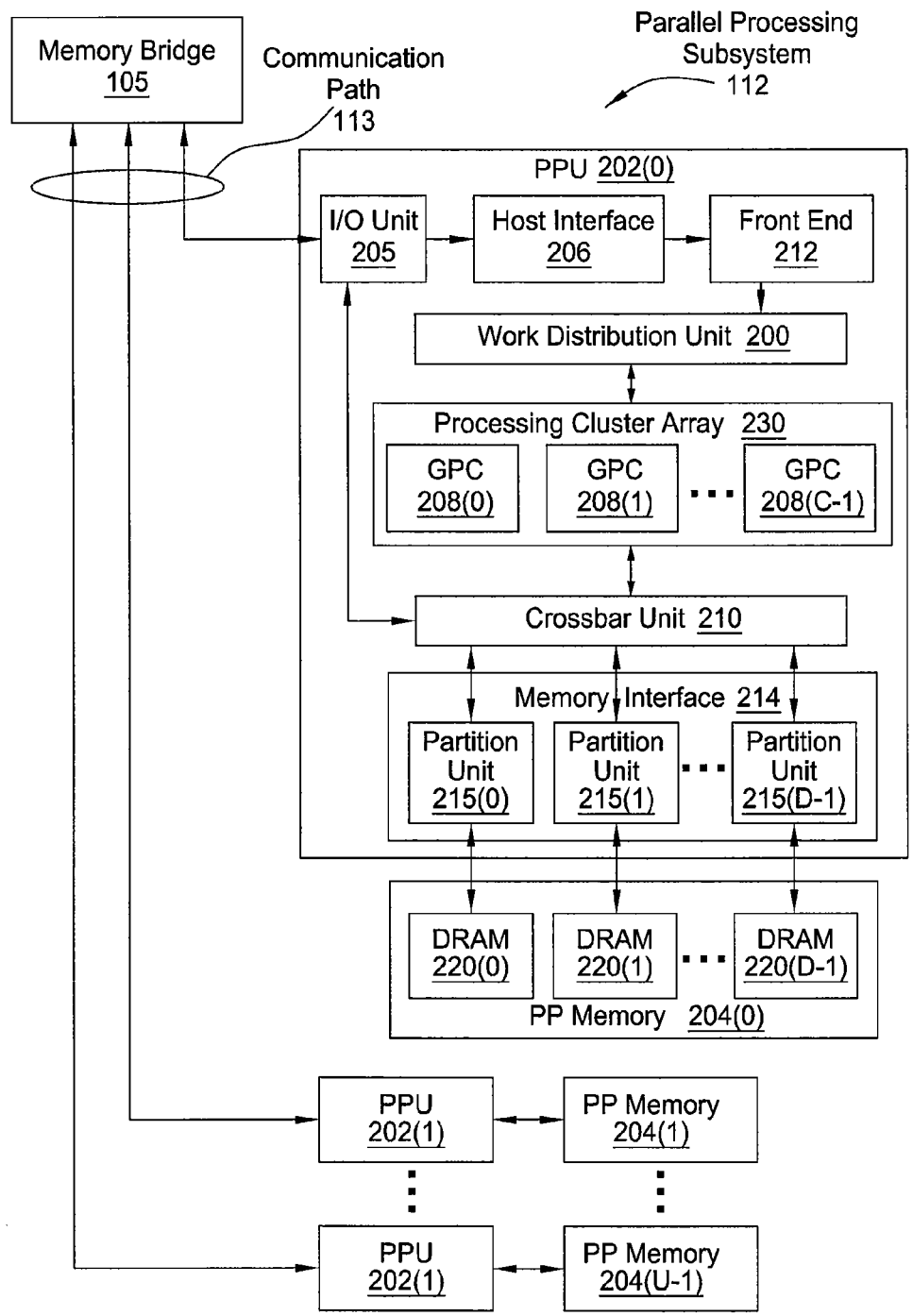
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip.

PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
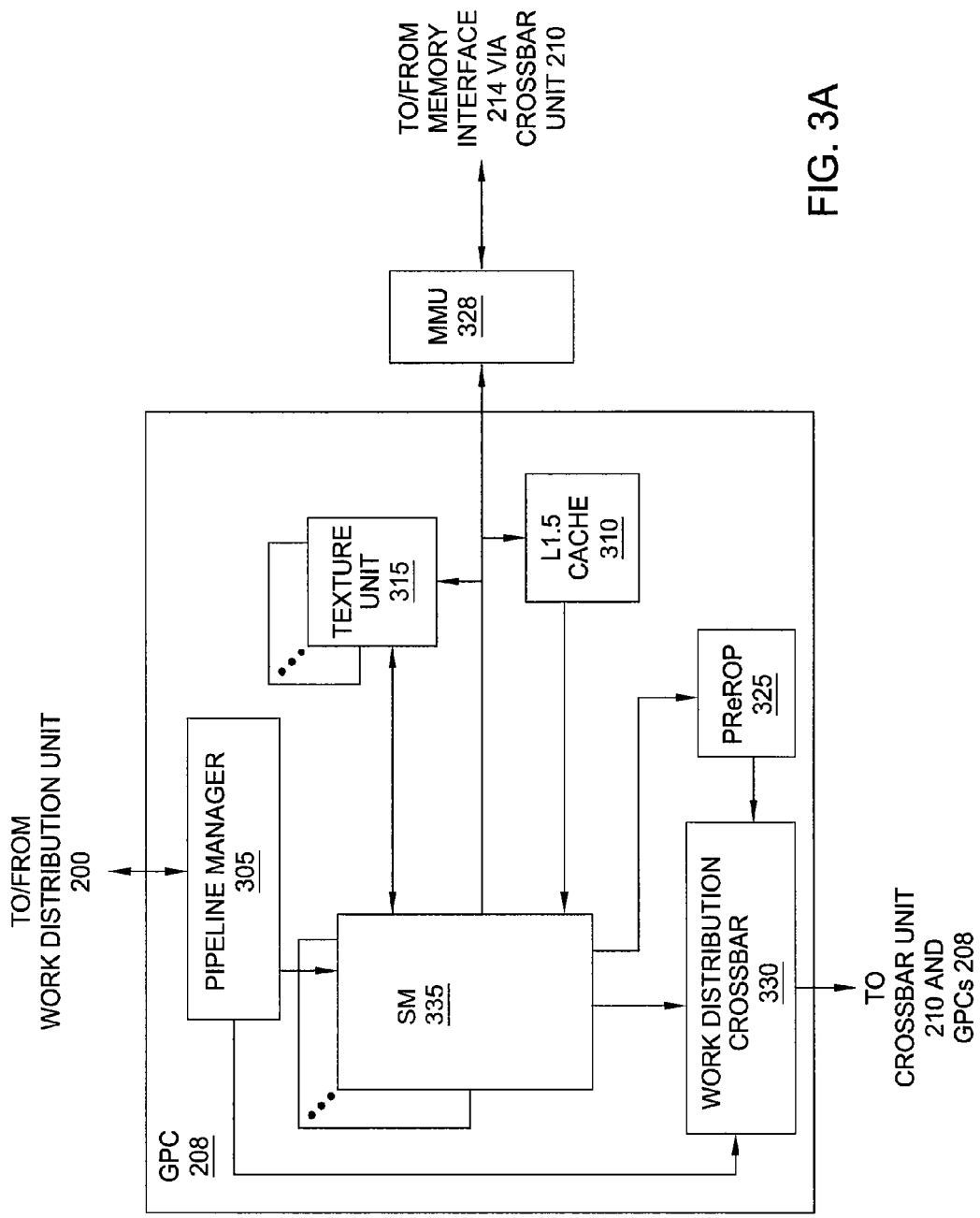
FIG. 3A is a block diagram of a GPC within one of the PPUs of FIG. 2, according to one embodiment of the invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SMs) 335. Pipeline manager 305 may also be configured to control a work distribution crossbar 330 by specifying destinations for processed data output by SMs 335.

In one embodiment, each GPC 208 includes a number M of SMs 335, where M≥1, each SM 335 configured to process one or more thread groups. Also, each SM 335 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 335 is referred to herein as a "warp" or "thread group." As used herein, a "thread group" refers to a group of threads concurrently executing the same program on different input data, with one thread of the group being assigned to a different processing engine within an SM 335. A thread group may include fewer threads than the number of processing engines within the SM 335, in which case some processing engines will be idle during cycles when that thread group is being processed. A thread group may also include more threads than the number of processing engines within the SM 335, in which case processing will take place over consecutive clock cycles. Since each SM 335 can support up to G thread groups concurrently, it follows that up to G*M thread groups can be executing in GPC 208 at any given time.

Additionally, a plurality of related thread groups may be active (in different phases of execution) at the same time within an SM 335. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 335, and m is the number of thread groups simultaneously active within the SM 335. The size of a CTA is generally determined by the programmer and the amount of hardware resources, such as memory or registers, available to the CTA.

Each SM 335 contains an L1 cache (not shown) or uses space in a corresponding L1 cache outside of the SM 335 that is used to perform load and store operations. Each SM 335 also has access to L2 caches within the partition units 215 that are shared among all GPCs 208 and may be used to transfer data between threads. Finally, SMs 335 also have access to off-chip "global" memory, which can include, e.g., parallel processing memory 204 and/or system memory 104. It is to be understood that any memory external to PPU 202 may be used as global memory. Additionally, an L1.5 cache 310 may be included within the GPC 208, configured to receive and hold data fetched from memory via memory interface 214 requested by SM 335, including instructions, uniform data, and constant data, and provide the requested data to SM 335. Embodiments having multiple SMs 335 in GPC 208 beneficially share common instructions and data cached in L1.5 cache 310.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 335 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SM 335 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 335 and is fetched from an L2 cache, parallel processing memory 204, or system memory 104, as needed. Each SM 335 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 335, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 335 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
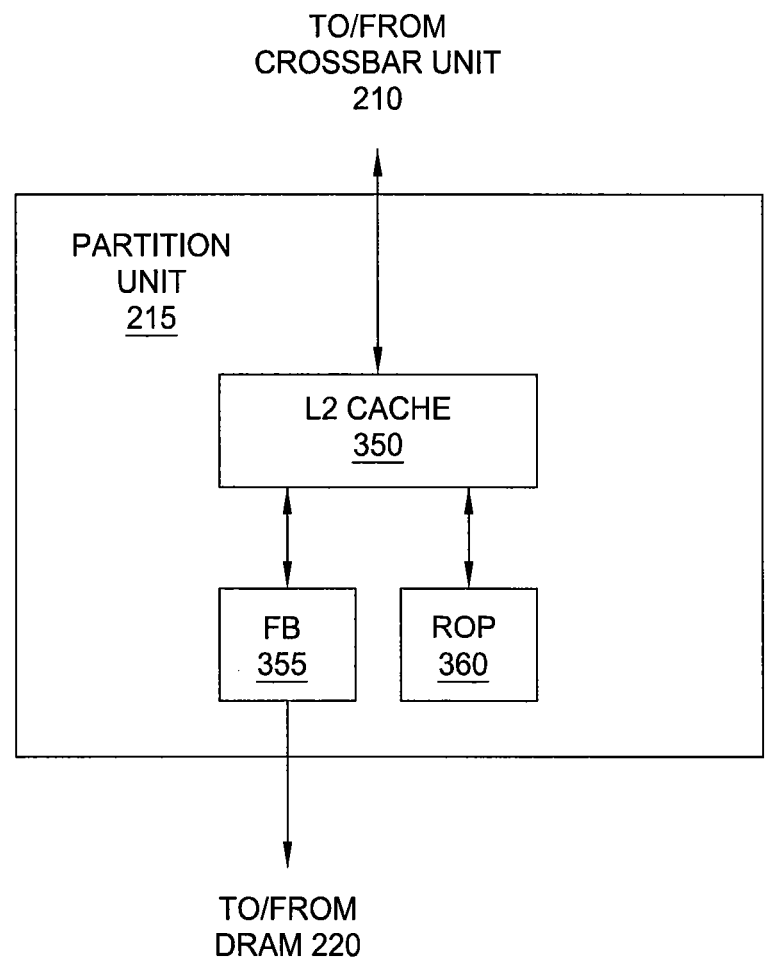
FIG. 3B is a block diagram of a partition unit within one of the PPUs of FIG. 2, according to one embodiment of the invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
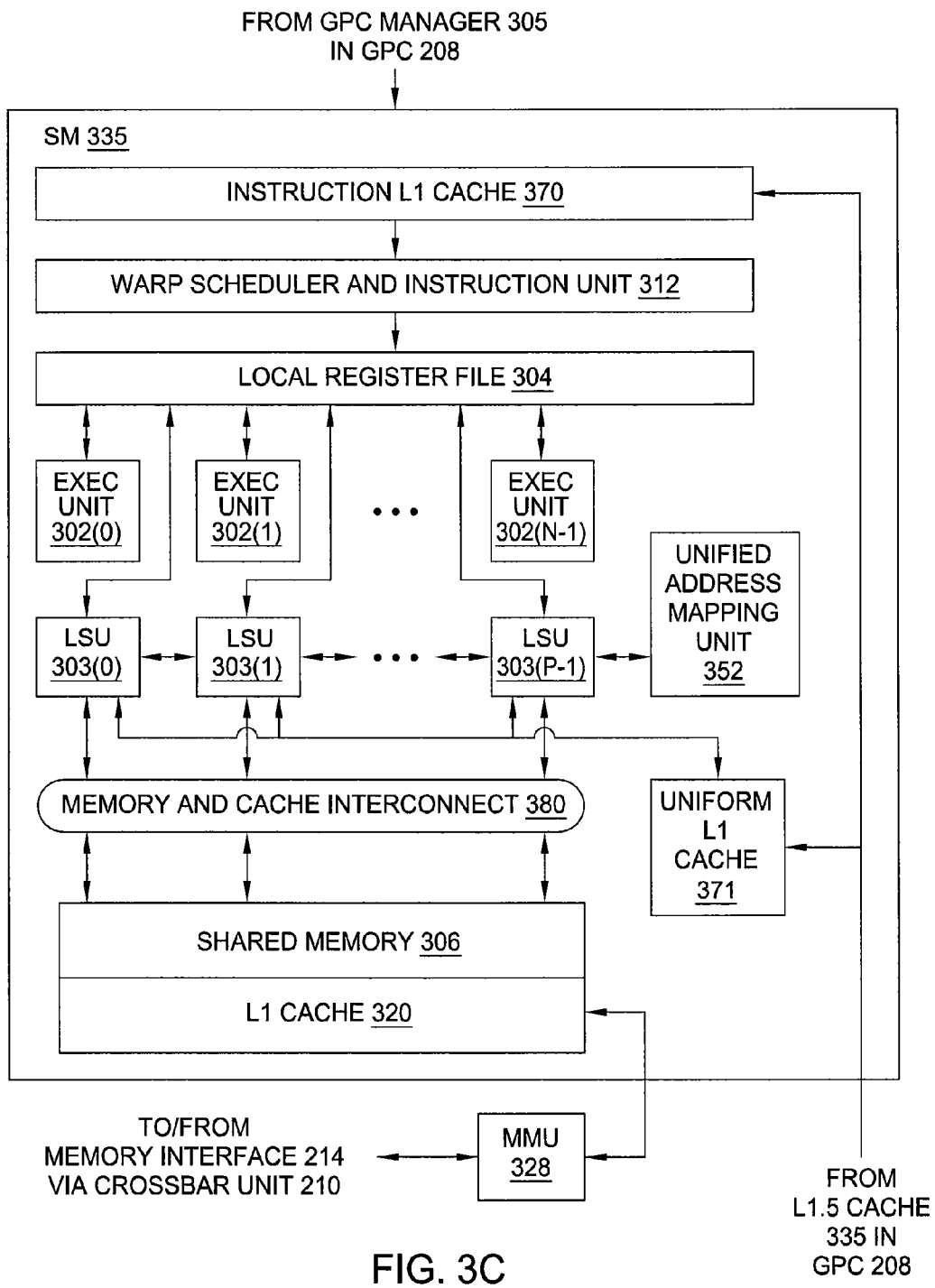
FIG. 3C is a block diagram of a portion of the SM of FIG. 3A, according to one embodiment of the invention.

FIG. 3C is a block diagram of the SM 335 of FIG. 3A, according to one embodiment of the present invention. The SM 335 includes an instruction L1 cache 370 that is configured to receive instructions and constants from memory via L1.5 cache 310. A warp scheduler and instruction unit 312 receives instructions and constants from the instruction L1 cache 370 and controls local register file 304 and SM 335 functional units according to the instructions and constants. The SM 335 functional units include N exec (execution or processing) units 302 and P load-store units (LSU) 303.

SM 335 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SM 335) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SM 335 to begin execution of a CTA that uses these parameters. Any CTA thread within any CTA (or any exec unit 302 within SM 335) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SM 335). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SM 335 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SM 335 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 310.

Graphics Pipeline Architecture

Figure 4:
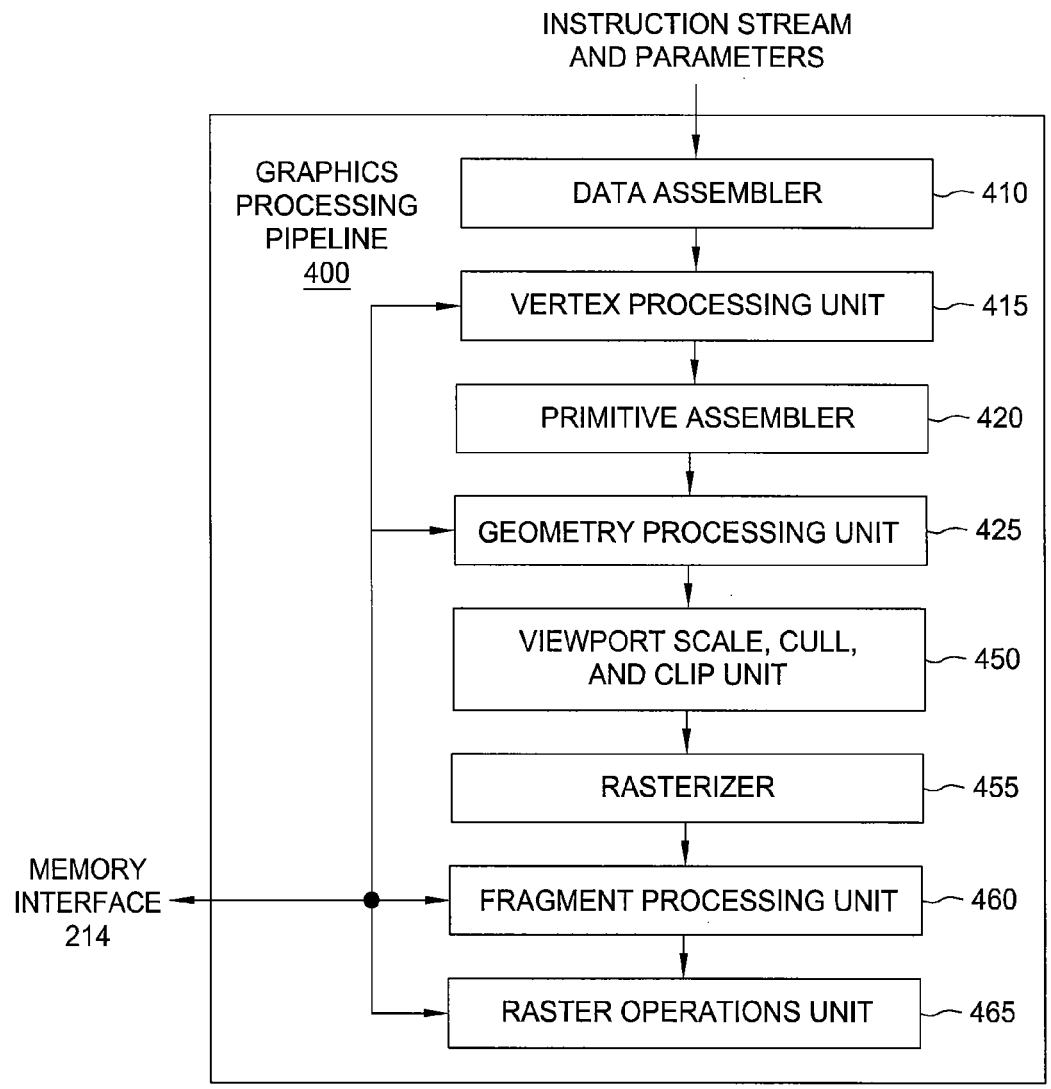
FIG. 4 is a conceptual diagram of a graphics processing pipeline that one or more of the PPUs of FIG. 2 can be configured to implement, according to one embodiment of the invention.

FIG. 4 is a conceptual diagram of a graphics processing pipeline 400, that one or more of the PPUs 202 of FIG. 2 can be configured to implement, according to one embodiment of the present invention. For example, one of the SM 335 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Programmable Compute Engine Screen Mapping

Figure 5A:
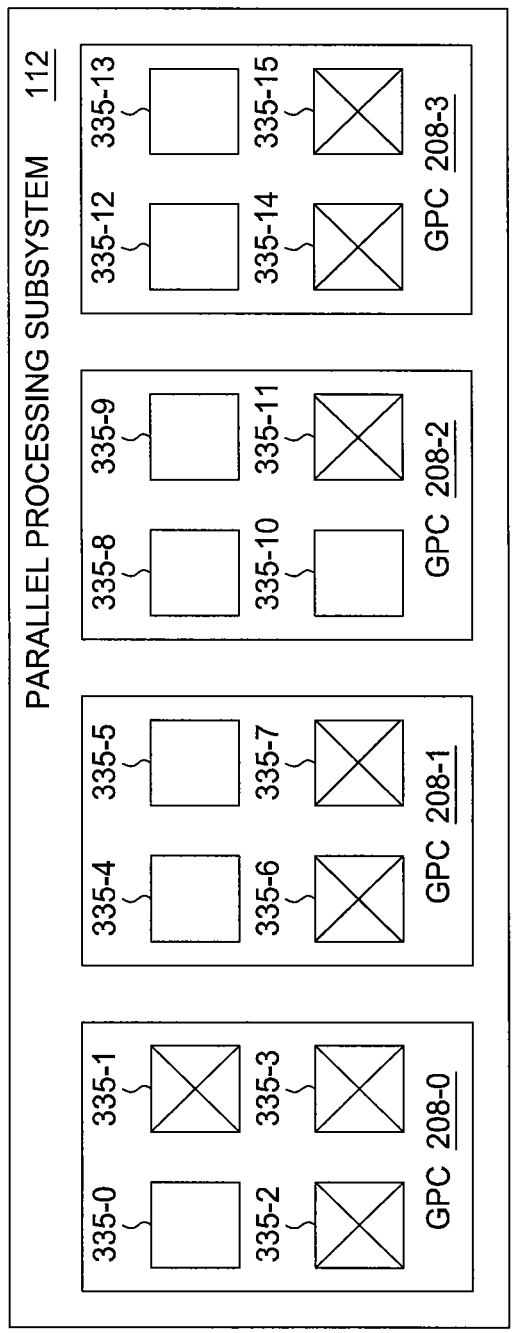
FIG. 5A is a block diagram of parallel processing subsystem 112, according to one embodiment of the invention.

As described in conjunction with FIG. 5A, each SM 335 within a GPC 208 generates a portion of the pixels corresponding to the screen tiles to which the GPC 208 is mapped. When the GPC 208 includes two or more SMs 335, the GPC 208 distributes the processing tasks amongst the SMs 335 such that each SM 335 generates a certain portion of the pixels associated with the GPC 208. The GPC 208 may distribute the processing tasks dynamically based, for example, on the amount of processing operations already assigned to each SM 335.

Each GPC 208 may include any number of SMs 335, and any number of those SMs 335 may be disabled for various reasons. A particular SM 335 may be disabled due to manufacturing defects or, alternatively, because the manufacturer of the parallel processing subsystem 112 has intentionally disabled that specific SM 335. For example, the manufacturer of parallel processing subsystem 112 may disable one or more SMs 335 to provide a low-cost version of the parallel processing subsystem 112. Additionally, any number of SMs 335 and/or GPCs 208 may be dynamically disabled during operation of parallel processing subsystem 112 to conserve power when those SMs 335/GPCs 208 are not needed.

As described in greater detail below in conjunction with FIGS. 5B-10, mapping engine 130 maps each GPC 208 to a number of screen tiles based on the number of enabled SMs 335 within the GPC 208. Mapping engine 130 determines the total number of enabled SMs 335 within parallel processing subsystem 112 and then determines the fraction of those SMs 335 included within each GPC 208. The mapping engine 130 maps a particular GPC 208 to a fraction of the screen tiles that is proportional to the fraction of SMs 335 included within the GPC 208. For example, if parallel processing subsystem 112 includes a first GPC 208 and a second GPC 208, where the first GPC 208 includes one enabled SM 335 and the second GPC 208 includes three enabled SMs 335, mapping engine 130 determines that one quarter (¼) of the total number of enabled SMs 335 reside within the first GPC 208 and the remaining three-quarters (¾) of enabled SMs 335 reside within the second GPC 208. Accordingly, the mapping engine 130 maps the first GPC 208 to ¼ of the screen tiles and maps the second GPC 208 to ¾ of the screen tiles.

As described in greater detail below in conjunction with FIGS. 5A-5B, mapping engine 130 generates a "GPC table" in order to map GPCs 208 to screen tiles. The GPC table includes a number of entries for each GPC 208 that reflects the number of enabled SMs 335 within the GPC 208. Mapping engine 130 also generates a square "GPC assignment grid" based on the GPC table and based on a "Y table," as described in greater detail below in conjunction with FIG. 6-7. Mapping engine 130 then determines the mapping between GPCs 208 and screen tiles of display screen 111 by replicating the GPC assignment grid across display screen 111, as described in greater detail in conjunction with FIG. 8. Although the following description is directed towards mapping GPCs 208 to screen tiles based on numbers of enabled SMs 335, the techniques described herein are equally applicable to mapping GPCs 208 to screen tiles based on numbers of disabled SMs 335.

FIG. 5A is a block diagram of parallel processing subsystem 112, according to one embodiment of the invention. The following description illustrates a technique for mapping GPCs 208-0 through 208-3 to screen tiles, according to one specific example. However, those skilled in the art will recognize that FIG. 5A illustrates an exemplary configuration of the parallel processing subsystem 112, and that numerous configurations are possible.

As shown, parallel processing subsystem 112 includes GPCs 208-0 through 208-3. GPC 208-0 includes one enabled SM 335-0 and 3 disabled SMs 335-1 through 335-3, GPC 208-1 includes two enabled SMs 335-4 through 335-5 and two disabled SMs 335-6 through 335-7, GPC 208-2 includes three enabled SMs 335-8 through 335-10 and one disabled SM 335-11, and GPC 208-3 includes two enabled SMs 335-12 through 335-13 and two disabled SMs 335-14 through 335-15. Accordingly, parallel processing subsystem 112 includes eight enabled SMs 335 total. Mapping engine 130 identifies these eight enabled SMs 335 and then generates a "GPC table" for use in mapping GPCs 208 to screen tiles, as described below in conjunction with FIG. 5B.

FIG. 5B is a conceptual diagram that illustrates a GPC table 500, according to one embodiment of the invention. Mapping engine 130 generates GPC table 500 when parallel processing subsystem 112 is configured according to FIG. 5A. Thus, the description of FIGS. 5B-10 is directed towards an exemplary situation where parallel processing subsystem 112 is configured according to FIG. 5A. However, when parallel processing subsystem 112 has a different configuration, mapping engine 130 may generate a different GPC table 500.

Mapping engine 130 initializes the GPC table 500 to include a number of entries that is proportional to the total number of enabled SMs 335. In the exemplary embodiment described herein, the mapping engine 130 initializes the GPC table 500 to include eight table entries 502, 504, 506, 508, 510, 512, 514, and 516, since the parallel processing subsystem 112 includes eight enabled SMs 335. Each of the table entries corresponds to a different X position. In one embodiment, each table entry corresponds to a different Y position. As shown, table entries 502, 504, 506, 508, 510, 512, 514, and 516 corresponds to X positions 0, 1, 2, 3, 4, 5, 6, and 7, respectively. Each GPC 208-0 through 208-1 is represented in GPC table 500 by a portion of the identifier associated with that GPC 208. For example, GPC 208-0 is represented by a "0" in table entry 502, and so forth.

Again, GPC table 500 includes a number of table entries for a given GPC 208 that reflects the number of enabled SMs 335 within the particular GPC 208. For example, since GPC 208-0 includes one enabled SM 335, GPC table 500 includes one table entry corresponding to GPC 208-0 (table entry 502). Since GPC 208-1 includes two enabled SMs 335, GPC table 500 includes two table entries that correspond to GPC 208-1 (table entries 504 and 510). Since GPC 208-2 includes three enabled SMs 335, GPC table 500 includes three table entries that correspond to GPC 208-2 (table entries 506, 512, and 516). Since GPC 208-3 includes two enabled SMs 335, GPC table 500 includes two table entries that correspond to GPC 208-3 (table entries 508 and 514).

In one embodiment, mapping engine 130 populates GPC table 500 one table entry at a time by stepping through each GPC in the sequence of GPCs 208 and assigning the GPC to a particular table entry. When the last GPC in the sequence of GPCs 208 is reached (i.e., GPC 208-3), mapping engine 130 returns to the first GPC (i.e., GPC 208-0). If a given GPC has been assigned to a number of table entries that is proportional to the number of SMs 335 within that GPC 208, then the mapping engine 130 skips that GPC 208 when stepping through the sequence of GPCs 208.

For example, when populating GPC table 500, mapping engine 130 starts with GPC 208-0 and determines whether GPC 208-0 can be assigned to table entry 502. Since GPC 208-0 includes one enabled SM 335 and has not been assigned to any table entries yet, mapping engine 130 assigns GPC 208-0 to table entry 502. Mapping engine 130 then proceeds to table entry 504 and GPC 208-1. GPC 208-1 includes two enabled SMs 335 and has not been assigned to any table entries, so mapping engine 130 assigns GPC 208-1 to table entry 504. Mapping engine 130 proceeds in this fashion for table entries 506 and 508 and GPCs 208-2 and 208-3, respectively, before advancing to table entry 510.

Reaching the end of the sequence of GPCs 208, mapping engine 130 then returns to GPC 208-0. Since GPC 208-0 includes one enabled SM 335, and since GPC 208-0 has already been assigned to one table entry (table entry 502), GPC 208-0 is skipped and mapping engine 130 proceeds to GPC 208-1. GPC 208-1 includes two enabled SMs 335, though it has been assigned to only one table entry (table entry 504). Accordingly, mapping engine 130 assigns GPC 208-1 to table entry 510. Mapping engine 130 then proceeds to table entry 512 and GPC 208-2. Since GPC 208-2 includes three enabled SMs 335 and has been assigned to only one table entry, mapping engine 130 assigns GPC 208-2 to table entry 512. Mapping engine 130 then proceeds to table entry 514 and GPC 208-3. Since GPC 208-3 includes two enabled SMs 335 and has been assigned to only one table entry, mapping engine 130 assigns GPC 208-3 to table entry 514.

Mapping engine 130 then proceeds to table entry 516 and returns to GPC 208-0. GPC 208-0 is skipped for the same reason as before—namely, because GPC 208-0 has already been assigned to a number of table entries that is proportional to the number of enabled SMs 335 within GPC 208-0. Mapping engine 130 skips GPC 208-1 for similar reasons as skipping GPC 208-1, and proceeds to GPC 208-2. GPC 208-2 includes three enabled SMs 335 and has only been assigned to two table entries. Accordingly, GPC 208-2 is assigned to table entry 516. In this fashion, mapping engine 130 generates GPC table 500 to include a number of table entries corresponding to a given GPC 208 that is proportional to the number of enabled SMs 335 within that GPC 208.

Once mapping engine 130 generates GPC table 500, mapping engine 130 generates a GPC assignment grid. Mapping engine 130 uses the GPC assignment grid to map each of GPCs 208-0 through 208-3 to a specific screen tile. FIGS. 6 and 7 each illustrates a different GPC assignment grid that mapping engine 130 generates using a particular technique, as described below.

FIG. 6 is a conceptual diagram of a GPC assignment grid 600, according to one embodiment of the invention. As shown, GPC assignment grid 600 includes a plurality of grid cells 602-1 through 602-n. Each grid cell 602 is associated with a specific X position and a specific Y position, referred to herein as the X, Y position of the grid cell. For example, grid cell 602-1 is associated with X, Y position 0, 0, while grid cell 602-n is associated with X, Y position 7, 7. Mapping engine 130 assigns each of GPCs 208-0 through 208-3 to a specific grid cell 602 based on the X, Y position of that grid cell 602 and based on GPC table 500. In one embodiment, mapping engine 130 implements Equation 1 to assign a particular GPC 208 to a particular grid cell 602.

$$\text{GPC}=\text{GPC\_table}((Y*\text{small\_int}+X)\%\text{num\_SMs}) \quad \text{Equation 1}$$

In Equation 1, GPC_table represents GPC table 500, Y is the Y position of a particular grid cell 602, small_int is a small integer value, X is the X position of grid cell 602, and num_SMs is the total number of enabled SMs 335 within GPCs 208-0 through 208-3. In the example described herein, num_SMs is equal to eight. The quantity (Y*small_int+X)%num_SMs provides an index into GPC_table, which then specifies a particular GPC 208 to be assigned to grid cell 602. When small_int is equal to 1, Equation 1 can be used to generate GPC assignment grid 600. However, small_int may be equal to any integer value.

Mapping engine 130 may then project GPC assignment grid 600 onto display screen 111 such that each grid cell 602 corresponds to a different screen tile. Mapping engine 130 may then replicate GPC assignment grid 600 across display screen 111 until each screen tile is associated with a specific grid cell 602. Mapping engine 130 may then map the GPC 208 assigned to each grid cell 602 to the screen tile corresponding to that grid cell 602, resulting in a "screen mapping."

The screen mapping generated based on GPC assignment grid 600 advantageously distributes the processing workload amongst GPCs 208 when parallel processing subsystem 112 processes certain types of graphics data. Specifically, when parallel processing subsystem 112 performs processing operations associated with vertically and/or horizontally-oriented graphics objects, those objects may correspond to vertically and/or horizontally adjacent screen tiles of display screen 111. Since mapping engine 130 maps horizontally and vertically adjacent screen tiles to different GPCs 208, the processing workload required to generate the pixels associated with those graphics objects can be distributed amongst the various GPCs 208.

However, GPC assignment grid 600 includes diagonally adjacent grid cells 602 to which the same GPC 208 are mapped. Thus, when parallel processing subsystem 112 performs processing operations associated with diagonally-oriented graphics objects, a single GPC 208 may be tasked with generating pixels associated with those graphics objects. That GPC 208 may become overburdened with processing tasks, while the other GPCs 208 may be idle. Such a disproportionate distribution of processing tasks is inefficient and, thus, undesirable. FIG. 7 illustrates a GPC assignment grid constructed to overcome this specific issue.

FIG. 7 is a conceptual diagram of a GPC assignment grid 700, according to one embodiment of the invention. GPC assignment grid 700 is generated using an alternate technique that prevents diagonally-adjacent grid cells from being assigned to the same GPC 208. As shown, the GPC assignment grid 700 includes a plurality of grid cells 702-1 through 702-n. Like GPC assignment grid 600, each grid cell 702 of GPC assignment grid 700 is associated with one of the GPCs 208-0 through 208-3. Each grid cell 702 is also associated with a specific X, Y position.

Mapping engine 130 populates each grid cell 702 based on the X, Y position of the grid cell 702, the GPC table 400, and a "Y table" (not shown). The Y table includes an unordered list of Y positions. In the exemplary embodiment discussed herein, Y table={0 1 7 5 2 4 3 6}. In one embodiment, mapping engine 130 implements equation 2 to generate GPC assignment grid 700:

$$\text{GPC}=\text{GPC\_table}((X+Y\_\text{table}(Y\%\text{num\_}\\ \text{SMs}))\%\text{num\_SMs}) \quad \text{Equation 2}$$

In equation 2, as with equation 1, GPC_table represents GPC table 500, X is the X position of a particular grid cell 702, Y is the Y position of the grid cell 702, num_SMs is the total number of enabled SMs 335 in the parallel processing subsystem 112, and Y_table is the Y table described above. The quantity Y%num_SMs provides an index into the Y table. The modulus of that index is taken with num_SMs and the result is summed with X. That sum provides an index into GPC table 500, which specifies one of the GPCs 208-0 through 208-3 to be assigned to the grid cell 702 having the position specified by X and Y. In one embodiment, the techniques described herein are applicable to a situation where the X and Y components are swapped.

In another embodiment, Y_table is not used, and the quantity Y_table(Y%num_SMs) is replaced by Y*y_factor, where y_factor could be a relatively prime factor of the number of enabled SMs 335 or, alternatively, any integer value. y_factor could be determined dynamically at startup based on the number of enabled SMs 335, stored statically in memory, or determined through another technique (e.g., randomly generated). Additionally, two or more bits of the quantity Y*y_factor could be swapped to generate a pseudo-random number.

In yet another embodiment, Y_table is not used, and the quantity Y_table(Y%num_SMs) is replaced by a hash of the Y value.

Implementing equation 2 according to any of the embodiments described above essentially scrambles the assignment of GPCs 208-0 through 208-3 to grid cells 702, thereby avoiding extended adjacent regions of grid cells 702 that are assigned to the same GPC 208. In addition, the fraction of grid cells 702 assigned to a particular GPC 208 is still proportional to the fraction of SMs 335, out of the total number of SMs 335, that are included within that GPC 208.

Once mapping engine 130 has generated GPC assignment grid 700, mapping engine 130 projects GPC assignment grid 700 onto display screen 111 such that each grid cell 702 corresponds to a different screen tile, as described below in conjunction with FIG. 8.

Figure 8:
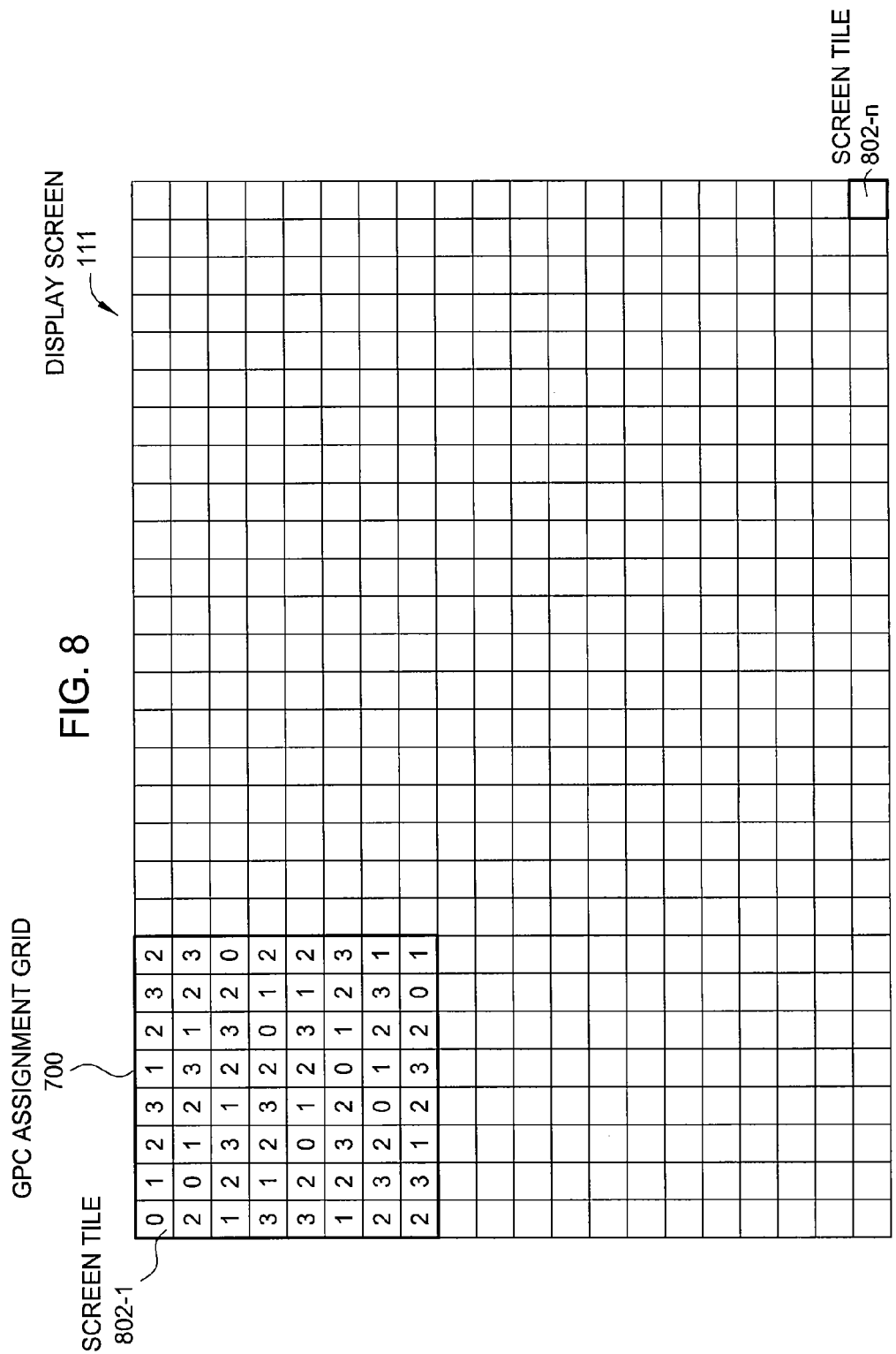
FIG. 8 is a conceptual diagram of a GPC assignment grid projected onto a display screen, according to one embodiment of the invention.

FIG. 8 is a conceptual diagram GPC assignment grid 700 projected onto display screen 111, according to one embodiment of the invention. As shown, display screen 111 is divided into screen tiles 802-1 through 802-n. GPC assignment grid 700 is projected to the upper-left corner of display screen 111. Each grid cell 702 of GPC assignment grid 700 covers a different screen tile 802. Mapping engine 130 maps the GPC 208 assigned to a given grid cell 702 to the screen tile 802 that falls beneath that grid cell 702. For example, grid cell 702-1, to which GPC 208-0 is assigned, covers screen tile 802-1. Thus, mapping engine 130 maps GPC 208-0 to screen tile 802-1.

Mapping engine 130 also replicates GPC assignment grid 130 across display screen 111. In other words, mapping engine 130 places identical copies of GPC assignment grid 700 in a sequence from the left side of display screen 111 to the right side of display screen 111. In some situations, mapping engine 130 cannot completely cover the horizontal span of display screen 111 with whole copies of GPC assignment grid 700. In this situation, a remainder of screen tiles will remain uncovered. This may occur when the number of screen tiles 802 across a horizontal span of display screen 111 is not a multiple of the number of grid cells 702 across a horizontal span of GPC assignment grid 700.

To solve this problem, mapping engine 130 projects a portion of a copy of GPC assignment grid 700 onto display screen 111 in order to cover the remaining, uncovered screen tiles. In this fashion, mapping engine 130 covers an entire horizontal span of display screen 111 with copies or portions of copies of GPC assignment grid 700.

Similarly, mapping engine 130 may also replicate GPC assignment grid 700 in the vertical direction in order to cover the vertical span of display screen 111. If any screen tiles remain uncovered, mapping engine 130 may project a portion of GPC assignment grid in order to cover the remaining, uncovered screen tiles. In this fashion, mapping engine 130 covers an entire vertical span of display screen 111 with copies or portions of copies of GPC assignment grid 700.

In one embodiment, mapping engine covers a horizontal span of display screen 111 with copies of GPC assignment grid 700 and then replicates this horizontal span across display screen 111 vertically to cover the remaining screen tiles of display screen 111. When the horizontal span cannot completely cover the remaining screen tiles, mapping engine 111 projects a portion of the horizontal span onto the display screen 111, such that all screen tiles are covered by a copy of GPC assignment grid 700 or a portion of a copy of GPC assignment grid 700. Those skilled in the art will recognize that many different techniques for tiling display screen 111 with GPC assignment grid 700 are also possible.

Through the techniques described above, mapping engine 130 covers each screen tile 802 with a specific grid cell 702. Mapping engine 130 then maps the GPC 208 associated with each grid cell 702 to the screen tile 802 that falls beneath that grid cell 702. Since a given GPC 208 is represented on GPC assignment grid 700 based on the number of enabled SMs 335 included in that GPC 208, the fraction of screen tiles 802 to which GPC 208 is mapped is proportional to the fraction of the enabled SMs 335 that are included within GPC 208. Based on this screen mapping, a given GPC 208 is tasked with generating a number of pixels that is proportional to the amount of processing power the GPC 208 can provide. Additionally, mapping engine 130 is configured to dynamically implement the techniques described above to generate a new screen mapping when the number of enabled SMs 335 changes. For example, mapping engine 130 may generate a new screen mapping when specific SMs 335 fail during operation. Alternatively, mapping engine 130 may generate a new screen mapping when specific SMs 335 are disabled during operation of parallel processing subsystem 112.

Figure 9:
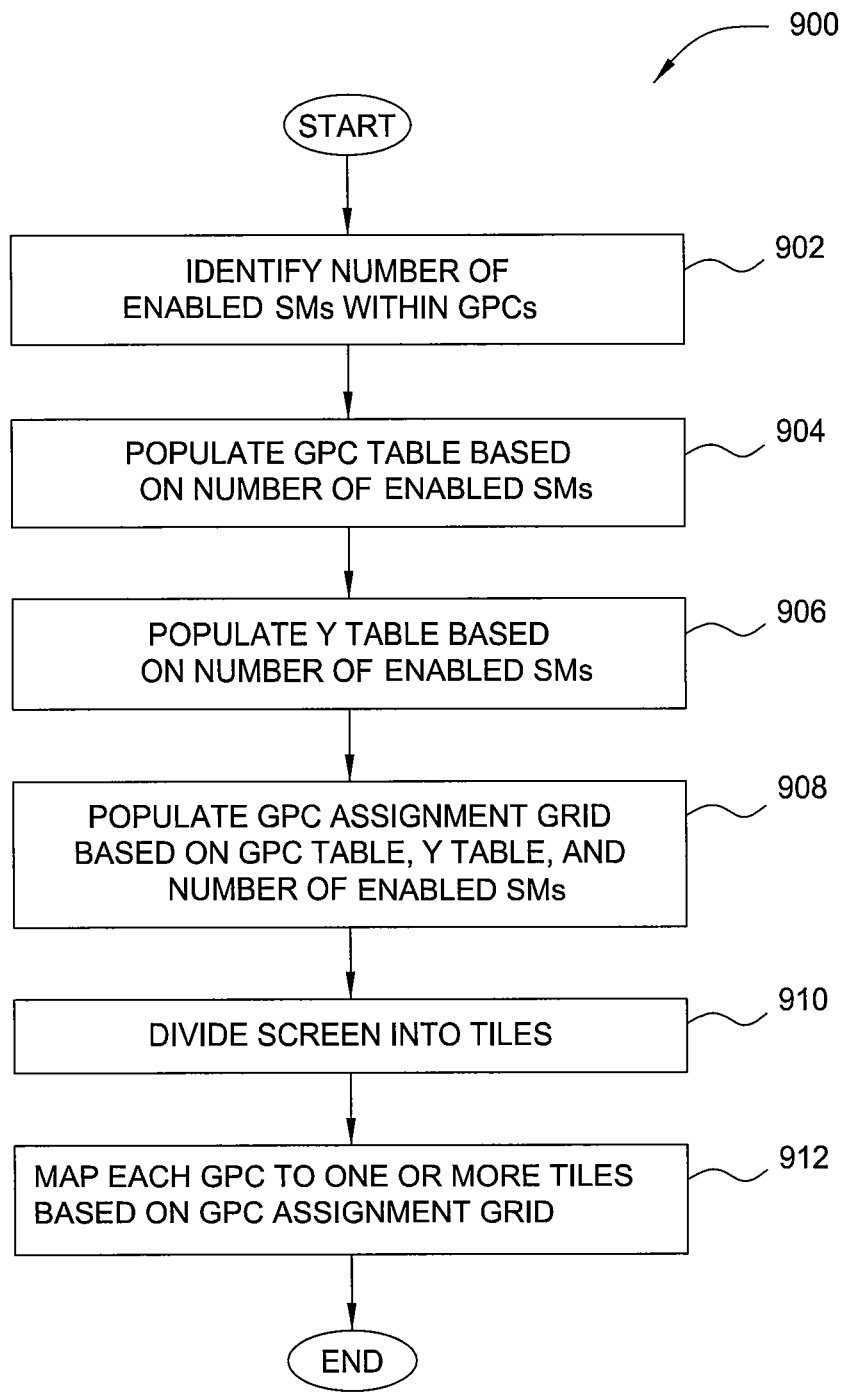
FIG. 9 is a flowchart of method steps for mapping GPCs to screen tiles, according to one embodiment of the invention.

FIG. 9 is a flowchart of method steps for mapping GPCs 208 to screen tiles 802, according to one embodiment of the invention. Persons skilled in the art will understand that, although the method 900 is described in conjunction with the systems of FIGS. 1-5, any system configured to perform the method steps, in any order, is within the scope of the present invention.

The method 900 begins at step 902, where mapping engine 130 identifies the total number of enabled SMs 335 within all of the GPCs 208. In the exemplary embodiment described in FIG. 5, the number of enabled SMs 335 is equal to eight. However, any other number of enabled SMs 335 is within the scope of the present invention.

At step 904, mapping engine 130 populates each table entry of GPC table 500 with an identifier associated with a specific GPC 208 based on the number of enabled SMs 335 within that GPC 208. In doing so, mapping engine 130 assigns a given GPC 208 to a specific table entry a number of times that is equal to the number of enabled SMs 335 within that GPC 208. A specific technique for generating GPC table 500 is described in FIG. 10. GPC table 500 may be stored in system memory 104, local PP memory 204, or in a register within one or more GPCs 208.

At step 906, mapping engine 130 populates the Y table based on the total number of enabled SMs 335. The Y table includes an unordered list of entries ranging from 0 to N−1, where N is the total number of enabled SMs 335 in the parallel processing subsystem 112. In one embodiment, mapping engine 130 generates the Y table by randomly assigning each number 0 through N−1 to a different entry in the Y table. The Y table may be stored in system memory 104, local PP memory 204, or in a register within one or more GPCs 208.

At step 908, mapping engine 130 populates GPC assignment grid 700 based on GPC table 500, the Y table, and the number of enabled SMs 335 within the GPCs 208. Mapping engine 130 populates each grid cell 702 of the GPC assignment grid 700 based on the X, Y position of the grid cell 702, the GPC table 500, and the Y table. In one embodiment, mapping engine 130 implements Equation 2 to generate GPC assignment grid 700.

At step 910, mapping engine 130 divides display screen 111 into screen tiles 802. In one embodiment, each screen tile 802 is a 16-pixel by 16-pixel square.

At step 912, mapping engine 130 maps each GPC 208 to a screen tile 802. Mapping engine 130 replicates GPC assignment grid 700 across display screen 111 horizontally to cover each screen tile 802 in a horizontal span of display screen 111. Mapping engine 130 may project a portion of a copy of GPC assignment grid 700 onto display screen 111 in order to completely cover each screen tile 802 in the horizontal span. Mapping engine 130 then replicates the horizontal span vertically to cover each screen tile 802 in a vertical span of display screen 111. Mapping engine 130 may project a portion of the horizontal span onto display screen 111 in order to completely cover each screen tile 802 in display screen 111 with a copy or a portion of a copy of GPC assignment grid 700. Those skilled in the art will understand that many techniques for tiling display screen 111 with copies of GPC assignment grid 700 are also possible.

Once mapping engine 130 covers each screen tile 802 with a specific grid cell 702 of GPC assignment grid 700, mapping engine 130 then maps the GPC 208 associated with each grid cell 702 to the screen tile 802 that falls beneath that grid cell 702. Since a given GPC 208 is represented on GPC assignment grid 700 based on the number of SMs 335 included in that GPC 208, the fraction of screen tiles 802 to which GPC 208 is mapped is proportional to the fraction of the enabled SMs 335 that are included within GPC 208. Through this mapping, a given GPC 208 is tasked with generating a number of pixels that is proportional to the amount of processing power the GPC 208 can provide.

Figure 10:
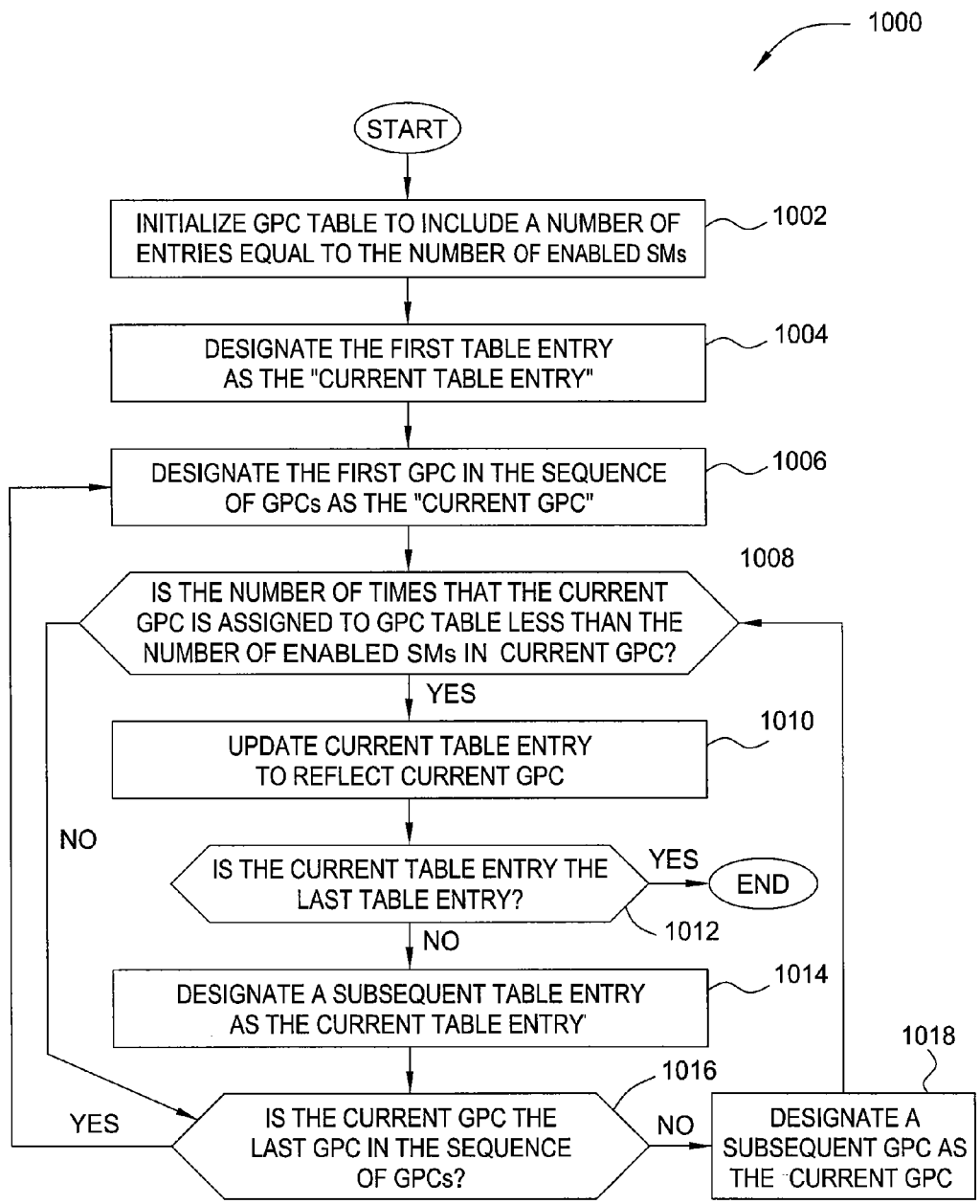
FIG. 10 is a flowchart of method steps for generating a GPC table, according to one embodiment of the invention.

FIG. 10 is a flowchart of method steps for generating GPC table 700, according to one embodiment of the invention. Persons skilled in the art will understand that, although the method 1000 is described in conjunction with the systems of FIGS. 1-5, any system configured to perform the method steps, in any order, is within the scope of the present invention.

As shown, the method 1000 starts at step 1002, where mapping engine 130 initializes GPC table 500 to include a number of entries that is proportional to the total number of enabled SMs 335 within parallel processing subsystem 112. At step 1002, mapping engine 130 designates the first table entry (table entry 502) as the "current table entry." At step 1006, mapping engine 130 designates the first GPC 208 in the sequence of GPCs 208 as the "current GPC." In the exemplary system described in FIG. 5, the first GPC 208 is GPC 208-0.

At step 1008, mapping engine 130 determines whether the number of times that the current GPC 208 has been assigned to GPC table 500 is less than the number of enabled SMs 335 in the current GPC 208. If the number of times that the current GPC 208 has been assigned to GPC table 500 is not less than the number of enabled SMs 335 in the current GPC 208, then the method 1010 proceeds to step 1016. Otherwise, the method 1000 proceeds to step 1010.

At step 1010, mapping engine 130 updates the current table entry to reflect the current GPC 208. The method 1000 then proceeds to step 1012. At step 1012, mapping engine 130 determines whether the current table entry is the last table entry in GPC table 500. If so, then the method 1000 ends. Otherwise, the method 1000 proceeds to step 1014.

At step 1014, the method 1000 designates a subsequent table entry as the current table entry. At step 1016, mapping engine 130 determines whether the current GPC is the last GPC 208 in the sequence of GPCs 208. If the current GPC is the last GPC 208 in the sequence of GPCs, the method 1000 returns to step 1006 and proceeds as described above. Otherwise, the method 1000 proceeds to step 1018.

At step 1018, the method 1000 designates a subsequent GPC 208 in the sequence of GPCs 208 as the current GPC. The method 1000 then returns to step 1008 and proceeds as described above.

Although the method 1000 describes one technique for generating GPC table 500 such that the number of table entries associated with a particular GPC 208 is proportional to the number of SMs 335 within that GPC 208, those skilled in the art will understand that other techniques are also possible. For example, mapping engine 130 could generate a screen mapping at startup or generate a screen mapping based on the number of enabled SMs 335, and then iteratively update the screen mapping to minimize the mapping of adjacent screen tiles to the same GPC 208. Alternatively, a static table stored in memory could specify mappings associated with particular numbers and/or distributions of enabled SMs 335. Mapping engine 130 could select a specific, stored mapping based on the determined number of enabled SMs 335.

In sum, a mapping engine maps general processing clusters (GPCs) to screen tiles on a display screen based on the number of enabled streaming multiprocessors (SMs) within each GPC. The mapping engine identifies the total number of enabled SMs within the GPCs and then generates a GPC table. The GPC table includes a number of table entries for a given GPC that is proportional to the number of enabled SMs within that GPC. The mapping engine then generates a GPC assignment grid based, in part, on the GPC table.

The GPC assignment grid includes a plurality of grid cells that each corresponds to one of the GPCs. The mapping engine generates the GPC assignment grid to avoid assigning vertically, horizontally, and diagonally adjacent grid cells to the same GPC. The mapping engine replicates the GPC assignment grid across the display screen such that each grid cell of the GPC assignment grid covers a specific screen tile. The mapping engine then maps the GPC associated with each grid cell to the screen tile covered by that grid cell. A given GPC then generates pixels associated with the screen tiles to which that GPC is mapped.

Advantageously, a GPC performs a portion of the total processing tasks that is based on the amount of processing power the GPC provides. In addition, GPCs are assigned to screen tiles such that vertically, horizontally, and diagonally adjacent screen tiles are mapped to different GPCs, thereby avoiding a situation where a single GPC performs a disproportionate amount of processing tasks. Finally, the mapping engine is configured to dynamically re-map GPCs to screen tiles, thereby flexibly adapting to situations where different numbers of SMs are enabled.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for mapping a plurality of general processing clusters (GPCs) included in a processing unit to screen tiles of a display screen, wherein each GPC includes one or more streaming multiprocessing units, comprising:
   determining a total number of streaming multiprocessing units that are enabled within the GPCs;
   generating a GPC table to map the GPCs to the screen tiles of the display screen, wherein the GPC table comprises a number of table entries equal to the total number of streaming multiprocessing units that are enabled within the GPCs;
   generating a GPC assignment grid to map the GPCs to the screen tiles of the display screen, wherein the GPC assignment grid includes a plurality of grid cells that each corresponds to a GPC; and
   mapping GPCs to N screen tiles, wherein N is proportional to the total number of enabled streaming multiprocessing units, and the number of times each GPC is mapped is proportional to the number of enabled streaming multiprocessing units therein.

2. The method of claim 1, wherein the N screen tiles are consecutively arranged horizontally or vertically.

3. The method of claim 2, wherein the GPCs are mapped in a predetermined order.

4. The method of claim 3, further comprising: repeating the mapping for another N screen tiles.

5. The method of claim 4, further comprising: repeating the mapping horizontally and vertically until all of the screen tiles are mapped.

6. The method of claim 1, wherein mapping GPCs to N screen tiles comprises:
   generating a fixed or programmable sequence of X or Y values;
   replicating the GPC assignment grid across the display screen such that each screen tile of the display screen corresponds to a grid cell included in the plurality of grid cells; and
   for each grid cell in the plurality of grid cells, mapping a GPC associated with the grid cell to a screen tile corresponding to the grid cell.

7. The method of claim 6, wherein generating the GPC table comprises assigning each GPC to a number of table entries in the GPC table based on the number of enabled streaming multiprocessing units therein.

8. The method of claim 6, wherein generating the sequence of X or Y values comprises assigning each of integers 0 through N−1 to a different position in the sequence of X or Y values, where N is proportional to the total number of enabled streaming multiprocessing units included in the GPCs.

9. The method of claim 6, wherein the sequence of X or Y values is generated by multiplying the X or Y position associated with each grid cell by an integer.

10. The method of claim 6, wherein generating the GPC assignment grid comprises assigning each GPC to one or more grid cells based on the GPC table, an X, Y position associated with the first grid cell, and the total number of enabled streaming multiprocessing units included in the GPCs.

11. The method of claim 6, wherein replicating the GPC assignment grid across the display screen comprises projecting a plurality of copies of the GPC assignment grid onto the display screen or projecting a plurality of portions of copies of the GPC assignment grid onto the display screen.

12. A non-transitory computer-readable medium storing program instructions that, when executed by a processing unit, map a plurality of general processing clusters (GPCs) to screen tiles of a display screen, wherein each GPC includes one or more streaming multiprocessing units, by performing the steps of:
   determining a total number of streaming multiprocessing units that are enabled within the GPCs;
   generating a GPC table to map the GPCs to the screen tiles of the display screen, wherein the GPC table comprises a number of table entries equal to the total number of streaming multiprocessing units that are enabled within the GPCs;
   generating a GPC assignment grid to map the GPCs to the screen tiles of the display screen, wherein the GPC assignment grid includes a plurality of grid cells that each corresponds to a GPC; and
   mapping GPCs to N screen tiles, wherein N is proportional to the total number of enabled streaming multiprocessing units, and the number of times each GPC is mapped is proportional to the number of enabled streaming multiprocessing units therein.

13. The computer-readable medium of claim 12, wherein the N screen tiles are consecutively arranged horizontally or vertically.

14. The computer-readable medium of claim 13, wherein the GPCs are mapped in a predetermined order.

15. The computer-readable medium of claim 14, further comprising the steps of: repeating the mapping for another N screen tiles.

16. The computer-readable medium of claim 15, further comprising the steps of: repeating the mapping horizontally and vertically until all of the screen tiles are mapped.

17. A system for mapping a plurality of general processing clusters (GPCs) included in a processing unit to screen tiles of a display screen, wherein each GPC includes one or more streaming multiprocessing units, comprising:
   the one or more GPCs that each includes one or more streaming multiprocessing units;
   a display device having the display screen, wherein the display screen is configured to be divided into the screen tiles;
   a central processing unit (CPU); and
   a memory unit storing program instructions that, when executed by the CPU, map the one or more GPCs to the screen tiles by performing the steps of:
      determining a total number of streaming multiprocessing units that are enabled within the one or more GPCs;
      generating a GPC table to map the GPCs to the screen tiles of the display screen, wherein the GPC table comprises a number of table entries equal to the total number of streaming multiprocessing units that are enabled within the GPCs;
      generating a GPC assignment grid to map the GPCs to the screen tiles of the display screen, wherein the GPC assignment grid includes a plurality of grid cells that each corresponds to a GPC; and
      mapping the one or more GPCs to N screen tiles, wherein N is proportional to the total number of enabled streaming multiprocessing units, and the number of times each of the one or more GPCs is mapped is proportional to the number of enabled streaming multiprocessing units therein.

18. The system of claim 17, wherein the N screen tiles are consecutively arranged horizontally or vertically.

19. The system of claim 18, wherein the GPCs are mapped in a predetermined order.

20. The system of claim 19, wherein the CPU executes the program instructions to repeat the mapping for another N screen tiles.

21. The system of claim 20, wherein the CPU executes the program instructions to repeat the mapping horizontally and vertically until all of the screen tiles are mapped.

* * * * *